US012717541B2

(12) United States Patent
Bae et al.

(10) Patent No.: US 12,717,541 B2
(45) Date of Patent: Aug. 25, 2026

(54) DISPLAY DEVICE FOR OUTPUTTING AUDIO

(71) Applicant: LG ELECTRONICS INC., Seoul (KR)

(72) Inventors: Kyung Nam Bae, Seoul (KR); Hyo Jeong Jeong, Seoul (KR); Eun Jung Lee, Seoul (KR); Yoon Suk Jang, Seoul (KR); Sang Hun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 153 days.

(21) Appl. No.: 18/428,296

(22) Filed: Jan. 31, 2024

(65) Prior Publication Data

US 2025/0138776 A1 May 1, 2025

(30) Foreign Application Priority Data

Oct. 27, 2023 (KR) ........................ 10-2023-0146052

(51) Int. Cl.
*G06F 3/16* (2006.01)
*G06F 3/0482* (2013.01)
(Continued)

(52) U.S. Cl.
CPC ............ *G06F 3/165* (2013.01); *G06F 3/0482* (2013.01); *G06F 3/04897* (2013.01); *H04R 3/12* (2013.01); *H04R 2499/15* (2013.01)

(58) Field of Classification Search
CPC .... G06F 3/165; G06F 3/0482; G06F 3/04897; H04R 3/12; H04R 2499/15
See application file for complete search history.

(56) References Cited

U.S. PATENT DOCUMENTS 8,886,524 B1 * 11/2014 Watanabe ............... G10L 15/22 704/201
9,712,266 B2 7/2017 Linde et al.
(Continued)

FOREIGN PATENT DOCUMENTS

CN 1937403 3/2007
KR 10-2018-0026160 3/2018
(Continued)

OTHER PUBLICATIONS

Korean Intellectual Property Office Application No. 10-2023-0146052, Notice of Allowance dated Jan. 31, 2025, 2 pages.
(Continued)

*Primary Examiner* — Haoshian Shih
(74) *Attorney, Agent, or Firm* — LEE, HONG, DEGERMAN, KANG & WAIMEY

(57) ABSTRACT

A display device includes a controller that obtains a plurality of sound sources respectively corresponding to a plurality of content, and generates one or more sink sound sources for transmission to at least one of a plurality of sink devices based on one or more sound sources among the plurality of sound sources. The controller may generate one or more sink sound sources for transmission to at least one sink device corresponding to at least one sink device item selected based on a user input for selecting at least one of a plurality of sink device items included in each of a plurality of sink device lists.

11 Claims, 15 Drawing Sheets

(51) Int. Cl.
*G06F 3/0489* (2022.01)
*H04R 3/12* (2006.01)

(56) References Cited

U.S. PATENT DOCUMENTS

| | | | | |
|---|---|---|---|---|
| 11,042,348 | B2 * | 6/2021 | Trapp | G06F 3/0488 |
| 2013/0080955 | A1 * | 3/2013 | Reimann | G06F 3/165 715/769 |
| 2021/0168431 | A1 | 6/2021 | Choi et al. | |
| 2021/0358515 | A1 * | 11/2021 | Williams | G10L 21/0232 |
| 2023/0097914 | A1 | 3/2023 | Balasubramanian et al. | |
| 2023/0224527 | A1 * | 7/2023 | Colby | H04N 21/26291 725/34 |
| 2023/0297324 | A1 * | 9/2023 | Yu | H04R 3/12 700/94 |

FOREIGN PATENT DOCUMENTS

| | | |
|---|---|---|
| KR | 10-2018-0052302 | 5/2018 |
| KR | 10-2019-0028027 | 3/2019 |
| KR | 10-2020-0016825 | 2/2020 |

OTHER PUBLICATIONS

European Patent Office Application Serial No. 24159143.7, Search Report dated May 13, 2024, 13 pages.

* cited by examiner

Figure 6:
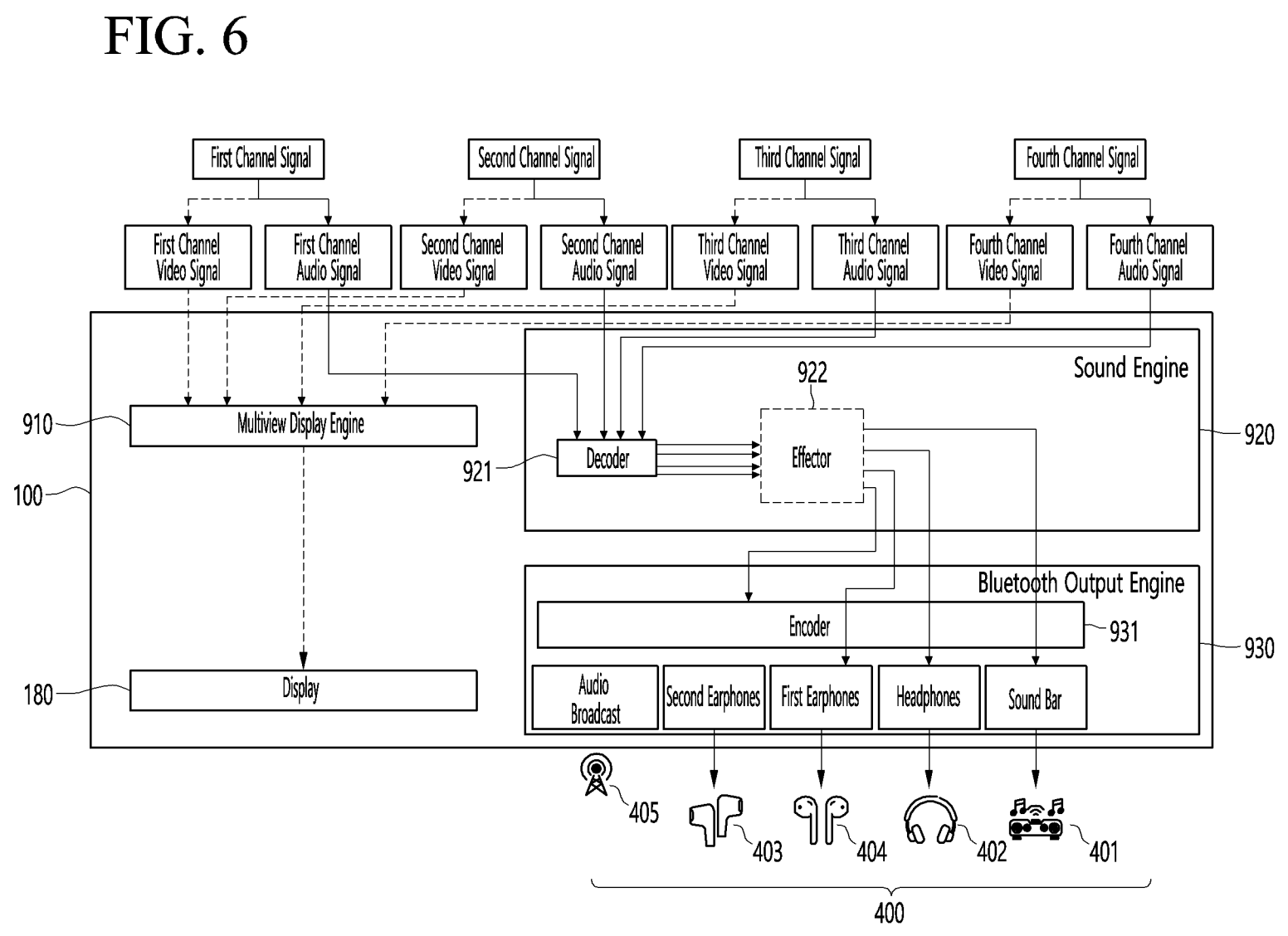

First Channel Signal
First Channel Video Signal
First Channel Audio Signal
Second Channel Signal
Second Channel Video Signal
Second Channel Audio Signal
Third Channel Signal
Third Channel Video Signal
Third Channel Audio Signal
Fourth Channel Signal
Fourth Channel Video Signal
Fourth Channel Audio Signal 100
910 Multiview Display Engine
180 Display
920 Sound Engine
921 Decoder
922 Effector
930 Bluetooth Output Engine
931 Encoder
Audio Broadcast
Second Earphones
First Earphones
Headphones
Sound Bar
400
401
402
403
404
405

FIG. 11
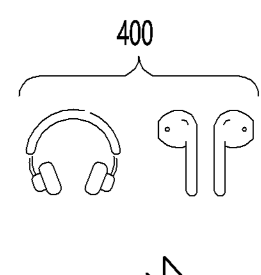
Bluetooth LE Audio Sink Devices
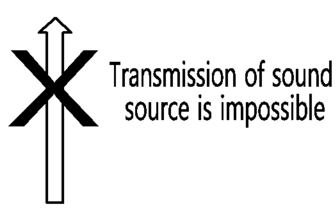
Bluetooth Audio Classic Source Devices
500

FIG. 13
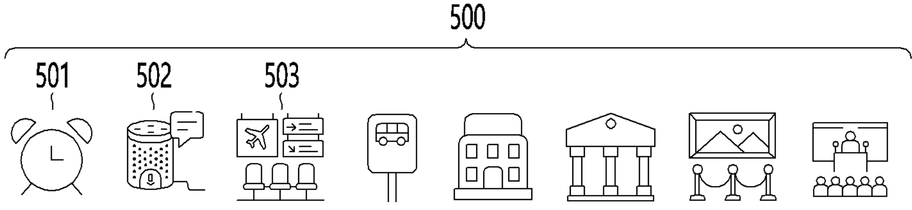
Bluetooth LE Audio Source Devices
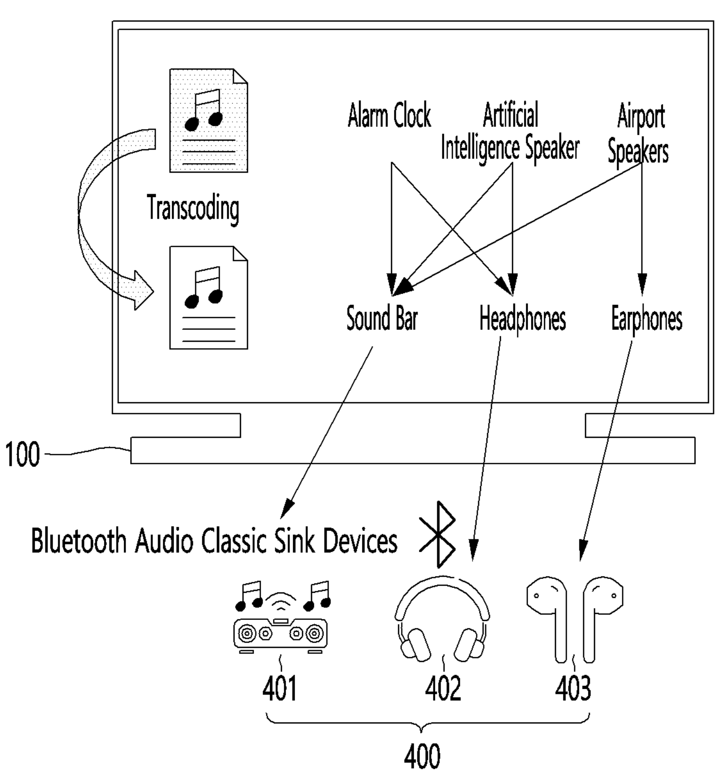
Bluetooth Audio Classic Sink Devices
401 402 403
400

FIG. 14
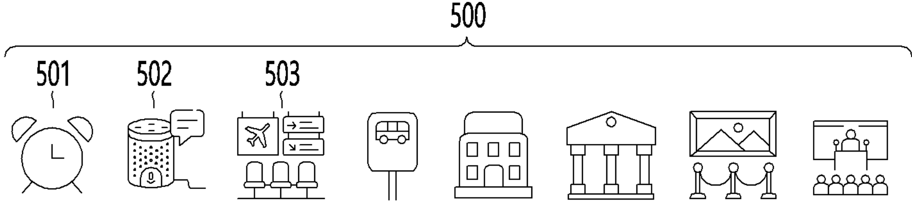
Bluetooth LE Audio Source Devices
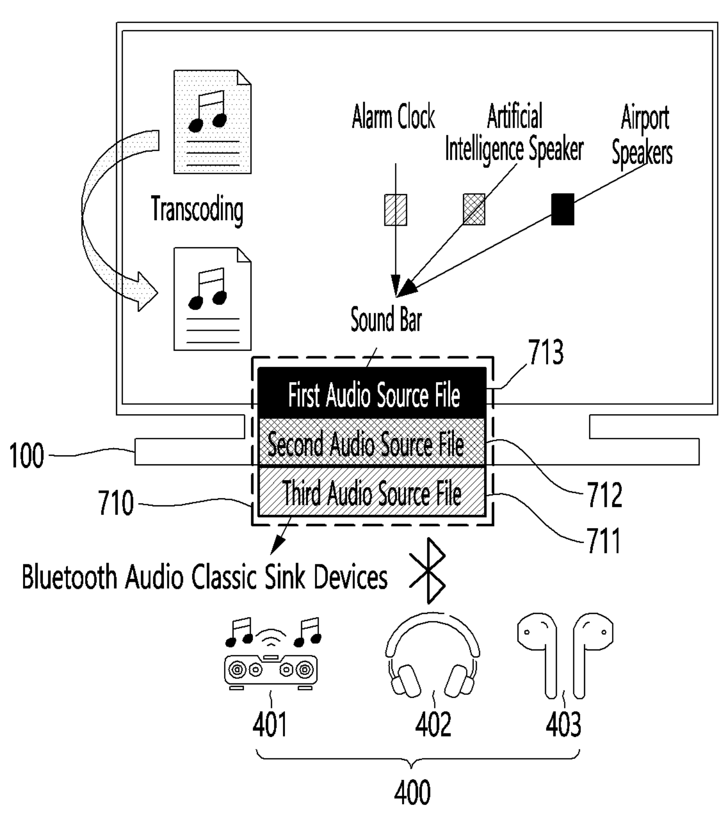
Bluetooth Audio Classic Sink Devices
401
402
403
400

FIG. 16
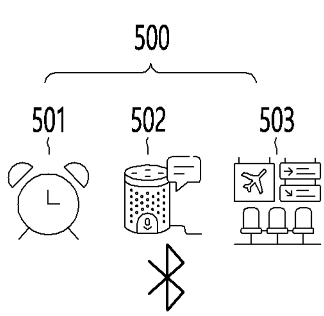
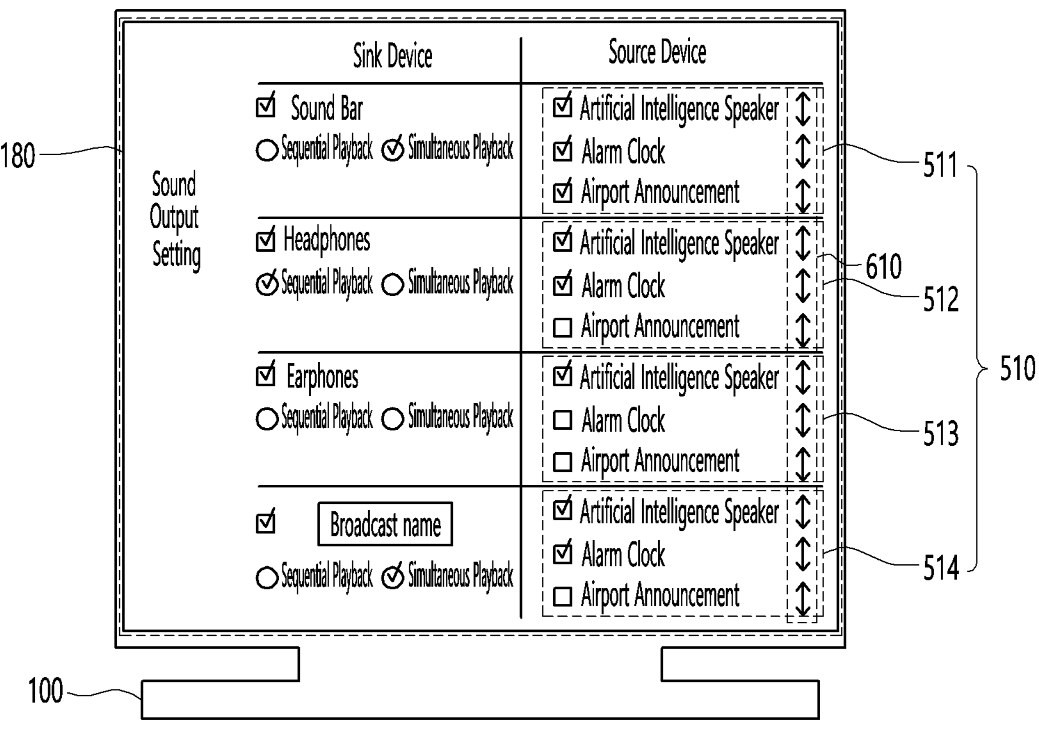
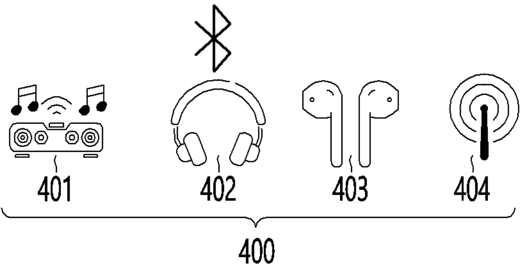

DISPLAY DEVICE FOR OUTPUTTING AUDIO

CROSS-REFERENCE TO RELATED APPLICATIONS

Pursuant to 35 U.S.C. § 119 (a), this application claims the benefit of earlier filing date and right of priority to Korean Patent Application No. 10-2023-0146052, filed on Oct. 27, 2023, the contents of which are all hereby incorporated by reference herein in their entireties.

BACKGROUND OF THE INVENTION

1. Field of the Invention

The present disclosure relates to a display device. Specifically, the present disclosure relates to a display device for outputting audio of a plurality of content.

2. DISCUSSION OF THE RELATED ART

Digital TV services using wired or wireless communication networks are becoming common. Digital TV services are capable of providing various services that could not be provided by the existing analog broadcasting services.

For example, Internet Protocol Television (IPTV) and smart TV services, which are types of digital TV services, provide interactivity so that users can actively select the types of watching programs, the watching time, and the like. The IPTV and smart TV services can provide various additional services, such as Internet search, home shopping, and online games, based on such interactivity.

Meanwhile, a TV can divide the display into a plurality of regions and provide different content for the plurality of regions. In other words, the TV can provide a plurality of content simultaneously.

However, in the past, there was a problem that only the audio of one content could be output, and the audio of the remaining content could not be output even when displaying multiple content simultaneously.

Additionally, there was a problem in which audio of content could not be output depending on the type of a source device and the type of a sink device connected to the TV.

SUMMARY OF THE INVENTION

The present disclosure provides a display device capable of outputting audio for each of a plurality of content in a multi-view mode in which the plurality of content is provided simultaneously.

The present disclosure provides a display device capable of enabling audio of content to be output from a sink device, regardless of the type of a source device and the type of a sink device.

The present disclosure provides a display device includes a wireless communication interface connected to a plurality of sink devices that output audio of content, a display that displays a content list including a plurality of content items respectively corresponding to a plurality of content and a plurality of sink device lists respectively corresponding to the plurality of content items, and a controller that obtains a plurality of sound sources respectively corresponding to the plurality of content, and generates one or more sink sound sources for transmission to at least one of the plurality of sink devices based on one or more sound sources among the plurality of sound sources. The controller may generate one or more sink sound sources for transmission to at least one sink device corresponding to at least one sink device item selected based on a user input for selecting at least one of a plurality of sink device items included in each of the plurality of sink device lists.

The present disclosure provides a display device capable of generating two or more sink sound sources for transmission to sink devices respectively corresponding to selected sink device items based on a sound source of content corresponding to one sink device list when receiving a user input for selecting two or more of sink device items included in one sink device of the one sink device list.

The present disclosure provides a display device capable of generating a first sink sound source and a second sink sound source, transmit the first sink sound source to a first sink device, and transmit the second sink sound source to a second sink device.

The present disclosure provides a display device capable of adjusting a volume to be output from each of the two or more sink sound sources based on a type of a sink device corresponding to a selected sink device item.

The present disclosure provides a display device capable of generating the sink sound source based on a priority. The priority is a priority set for a channel providing content or a scene of the content.

The present disclosure provides a display device capable of generating a sink sound source such that audio of a first channel with a highest priority is output while content of the first channel is displayed when a priority is a priority set for the channel providing a content, and generating a sink sound source such that audio of a second channel whose priority is next to the priority of the first channel is output while the content of the first channel is not displayed.

The present disclosure provides a display device capable of generating a sink sound source such that audio of a second channel is output when receiving a user input for ending display of a content item corresponding to a first channel.

The present disclosure provides a display device capable of generate a sink sound source such that audio of a channel displaying a scene of content with a highest priority is output when a priority is a priority set for the scene of the content.

The present disclosure provides a display device capable of obtaining a user input for selecting an audio output method, when receiving a user input for selecting an identical sink device item from two or more sink device lists among a plurality of sink device lists. The audio output method includes a simultaneous playback and a sequential playback.

The present disclosure provides a display device capable of generating a sink sound source such that audio of two or more content corresponding to two or more sink device lists are simultaneously output when obtaining a user input for selecting a simultaneous playback as an audio output method, and generating the sink sound source such that the audio of two or more content corresponding to the two or more sink device lists are sequentially output when obtaining the user input for selecting a sequential playback as the audio output method.

The present disclosure provides a display device capable of generating the sink sound source based on the audio output method and priority.

The present disclosure provides a display device capable of generating a sink sound source such that audio of content with a highest priority is output at a largest volume level when obtaining a user input for selecting a simultaneous playback as an audio output method.

The present disclosure provides a display device capable of generating a sink sound source such that audio of content with a highest priority is output in an earliest order when obtaining a user input for selecting a sequential playback as an audio output method.

According to an embodiment of the present disclosure, audio for each content simultaneously provided by a display device can be output.

According to an embodiment of the present disclosure, audio can be output from a sink device regardless of the type of source device and the type of sink device connected to a display device.

BRIEF DESCRIPTION OF THE DRAWINGS

FIG. 2 is a block diagram of a remote control device according to an embodiment of the present disclosure.

FIG. 6 is a diagram illustrating a method in which a display device provides videos and audios of a plurality of content according to an embodiment of the present disclosure.

FIG. 11 is a diagram for describing sound source transmission between a source device and a sink device.

FIG. 13 is a diagram for describing an operation in which a display device maps a source device and a sink device according to an embodiment of the present disclosure.

FIG. 14 is a diagram for describing an operation in which a display device transmits a sink sound source to a sink device according to an embodiment of the present disclosure.

FIG. 16 is a diagram for describing a sound output setting screen displayed by a display device according to an embodiment of the present disclosure.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
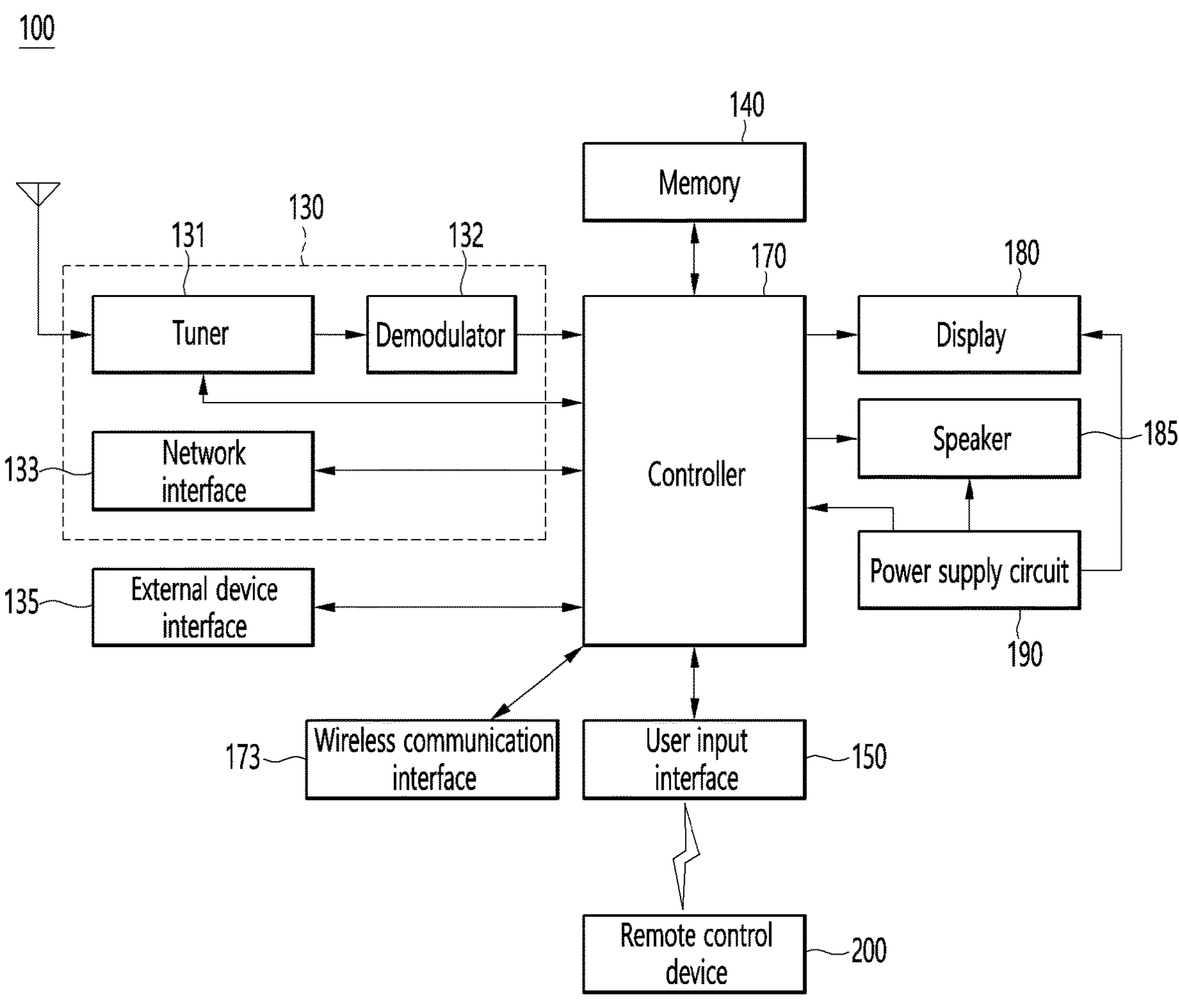
FIG. 1 is a block diagram showing a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100. In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device. In this case, an operation method of the display device according to an embodiment of the present disclosure will be described below may be implemented by not only the display device 100 as described with reference to FIG. 1 and but also one of an image processing device such as the separated set-top box and a content playback device including the display 180 the audio output unit 185.

Next, a remote control device according to an embodiment of the present disclosure will be described with reference to FIGS. 2 to 3.

Figure 2:
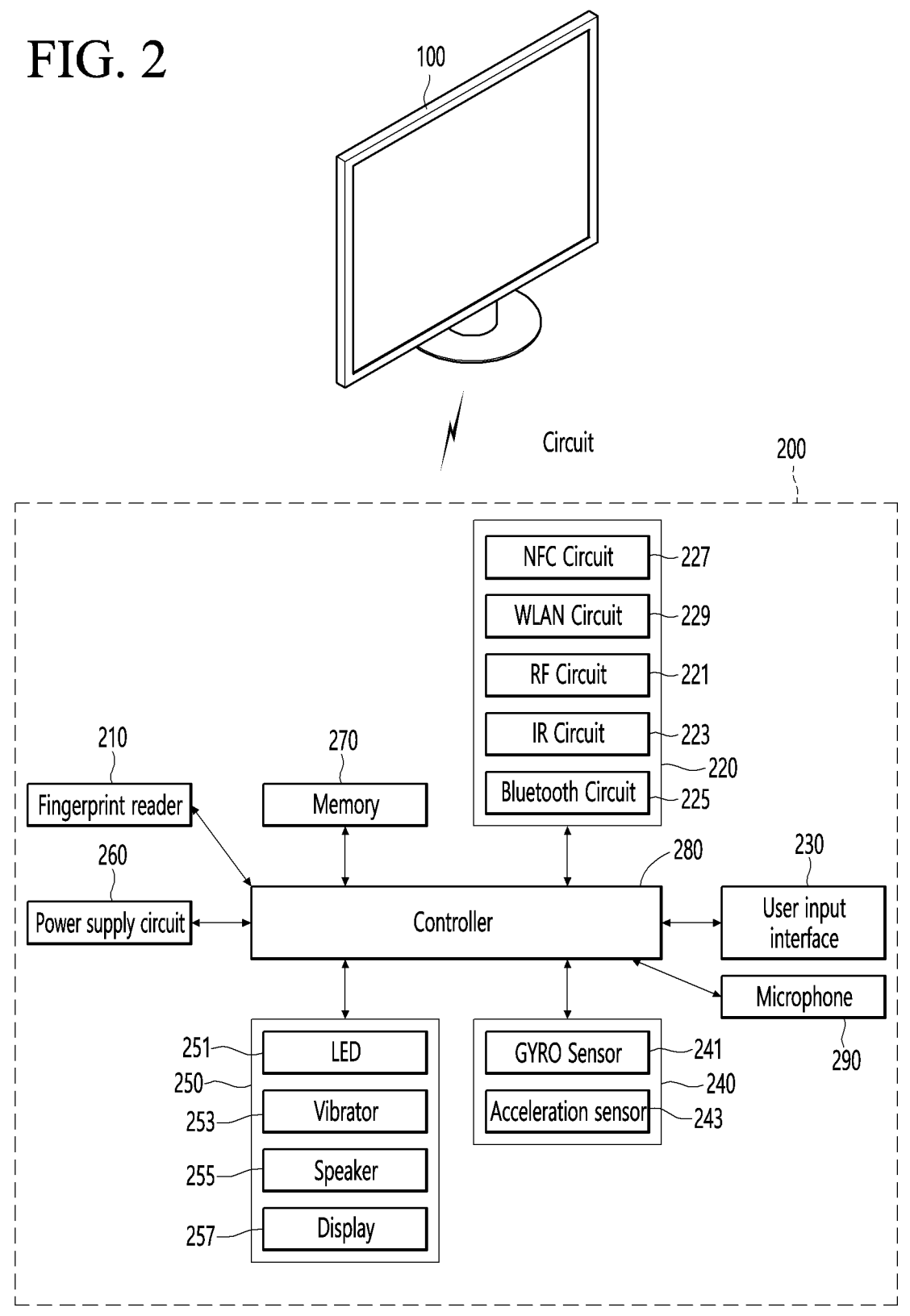
Figure 3:
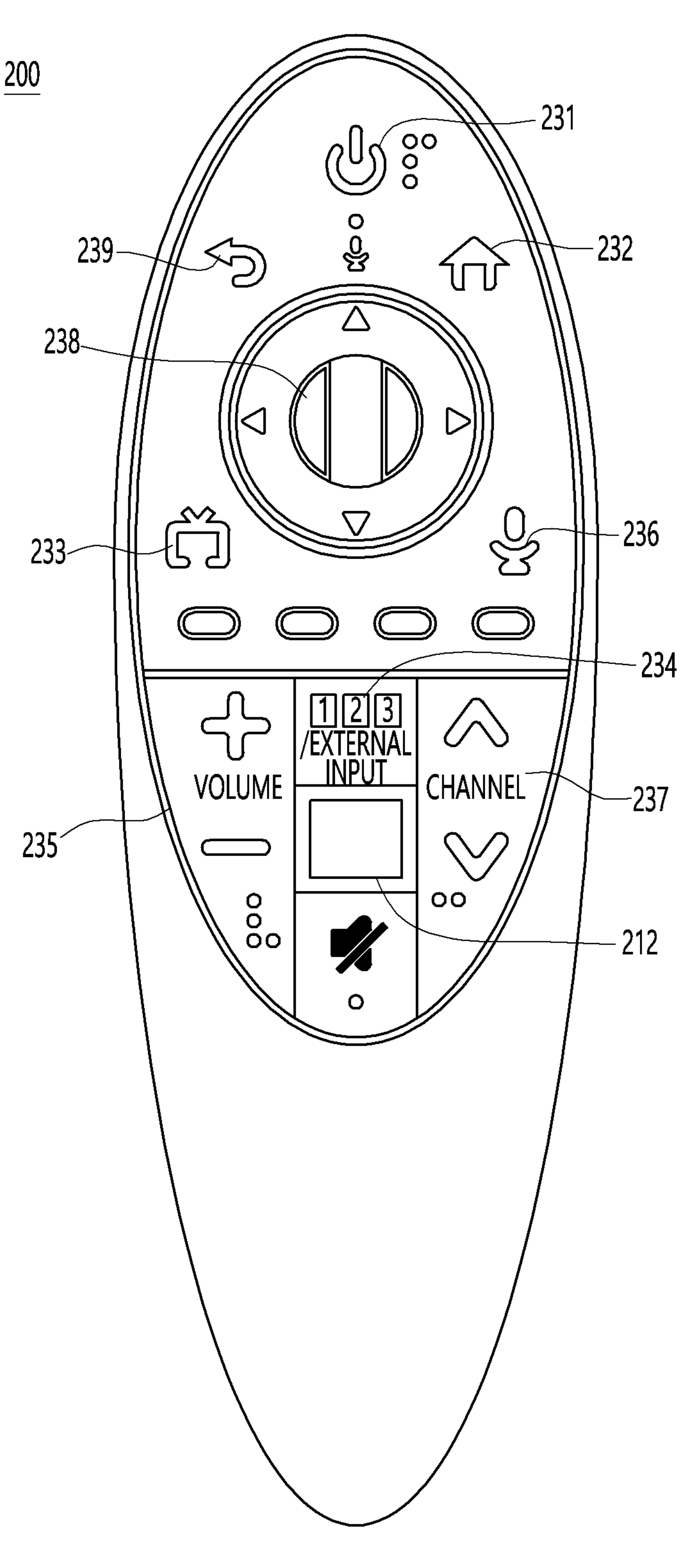
FIG. 3 shows an actual configuration example of a remote control device 200 according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290. Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, a description will be given referring to FIG. 4.

Figure 4:
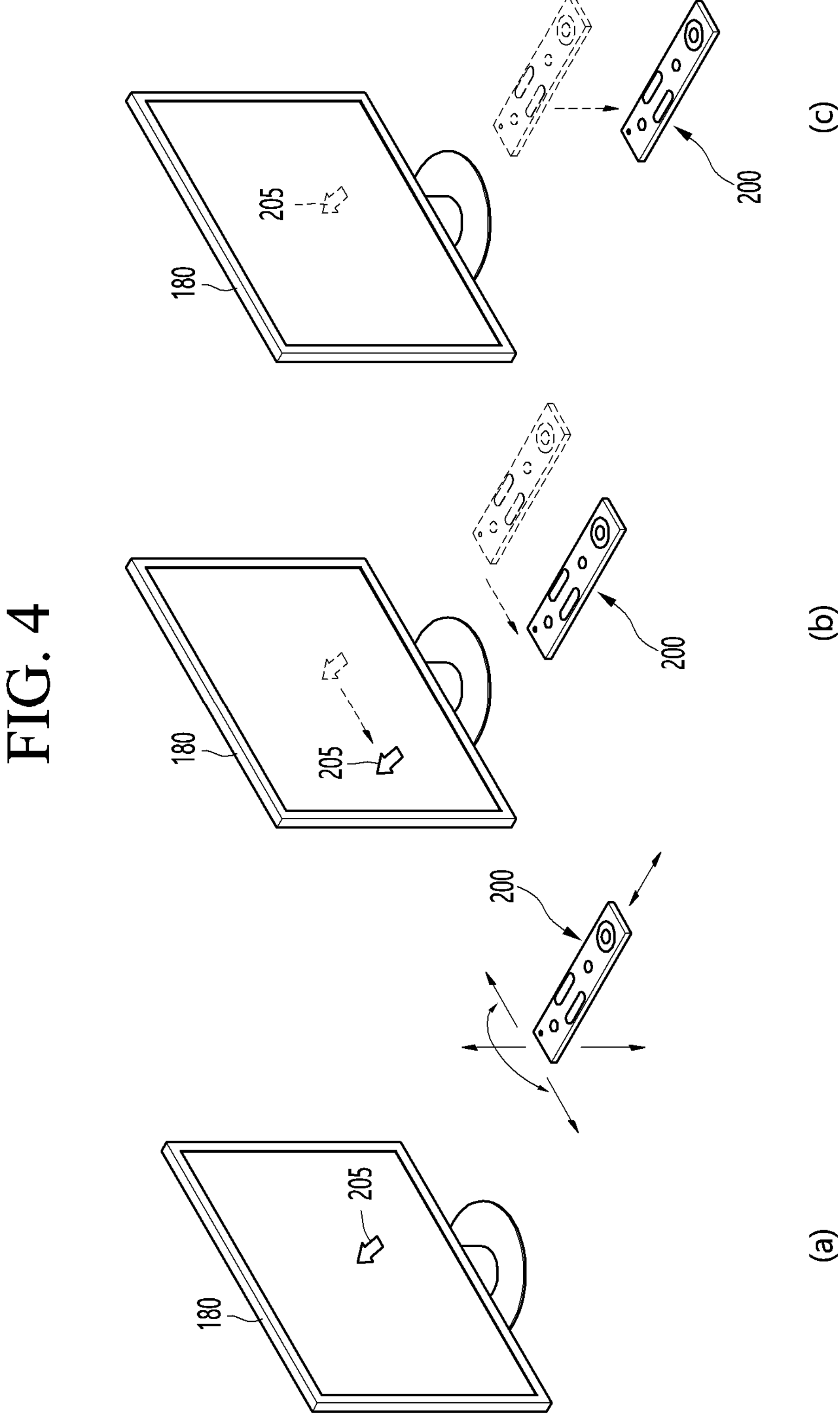
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200. Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Meanwhile, the display device 100 may output a plurality of content simultaneously. The display device 100 may divide an area of the display 180 into several regions and output different content for the regions. For example, the display device 100 may output video of each of the plurality of content with a multi-view screen. Accordingly, a user may receive a variety of content simultaneously and have a richer experience. Additionally, multiple users may receive their desired content using one display device 100. However, when the display device 100 outputs a plurality of content simultaneously, there is a problem in that only the audio of one of the plurality of content is output, and the audio of the remaining content cannot be heard.

A related description will be given with reference to FIG. 5.

Figure 5:
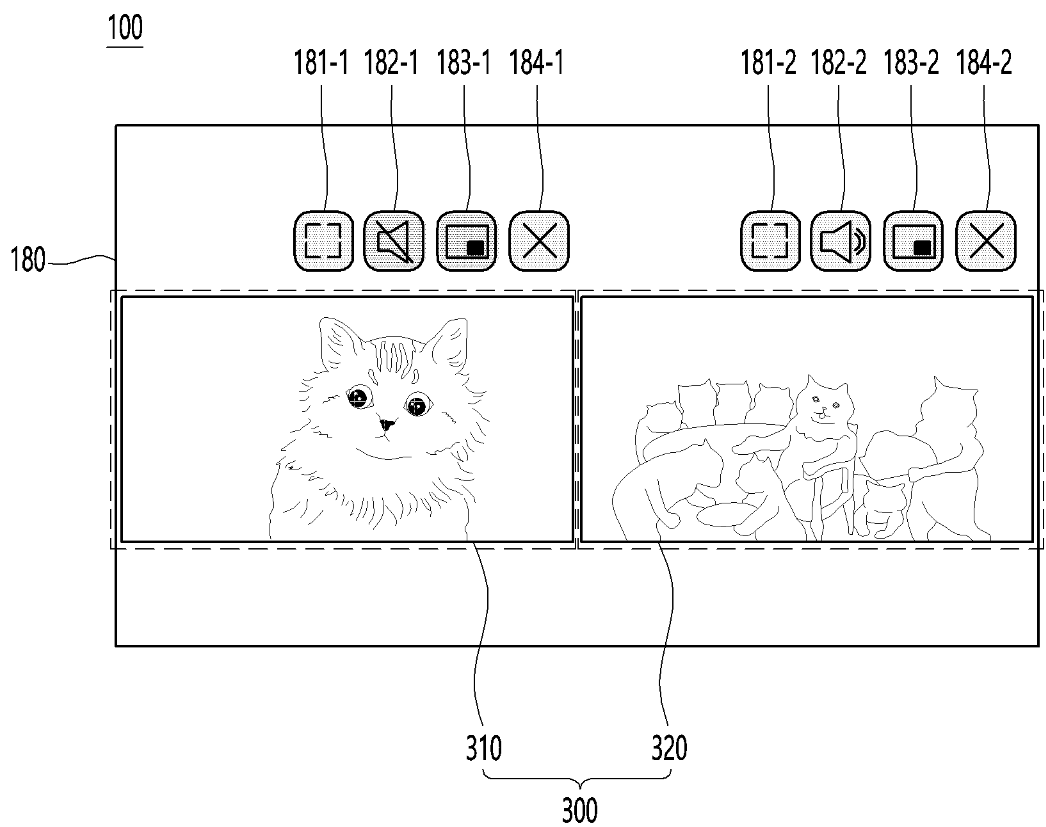
FIG. 5 is a diagram showing a display device simultaneously outputting videos of a plurality of content.

FIG. 5 is a diagram showing a display device simultaneously outputting videos of a plurality of content.

Referring to FIG. 5, the display device 100 may display a content list including a plurality of content items in one region 300 of the display 180. The content item may be an item corresponding to content. The content item may be a video provided by a channel. For example, the content item may be a video displayed in a first region 310 corresponding to content provided by a first channel. In this case, the content list may be displayed in a multi-view format.

Meanwhile, as described later with reference to FIG. 14, the content item may be the name of a source device providing content.

The display device 100 may display icons for controlling the output of each of a plurality of content.

For example, the display device 100 may display (1-1)-th to (4-1)-th icons 181-1, 182-2, 183-1, and 184-1 for controlling the output of first content. Additionally, the display device 100 may display (1-2)-th to (4-2)-th icons 181-2, 182-2, 183-2, and 184-2 corresponding to second content.

When the display device 100 receives an input for selecting one of the icons 181, 182, 183, and 184, the display device 100 may perform a function corresponding to the selected icon on content displayed in a region adjacent to the selected icon.

A first icon 181 may be an icon for displaying content in the entire area of the display 180, a second icon 182 may be an icon for outputting audio of the content or muting the content, a third icon 182 may be an icon for displaying the content in a Picture In Picture (PIP) screen, and a fourth icon 184 may be an icon for terminating the content. However, the types of icons displayed by the display device 100 are only examples and may be various depending on embodiments.

When the display device 100 receives an input for selecting the (2-1)-th icon 182-1, the display device 100 may start outputting audio of content displayed in the first region 310 and simultaneously mute second content displayed in the second area 320. Alternatively, when the display device 100 receives an input for selecting the (2-2)-th icon 182-2, the display device 100 may mute the second content and simultaneously start outputting audio of the first content.

That is, the display device 100 may output the audio of only one of a plurality of content. Accordingly, there is an inconvenience in that a user cannot receive audio information for two or more content among a plurality of content. Furthermore, when multiple users use the display device 100, there is a problem in that all of the users have no choice but to listen to audio of the same content.

Accordingly, the display device 100 according to an embodiment of the present disclosure is intended to output audio of two or more content among a plurality of content.

A related description will be given with reference to FIG. 6.

FIG. 6 is a diagram illustrating a method in which a display device provides videos and audios of a plurality of content according to an embodiment of the present disclosure.

The display device 100 may receive a content signal. Referring to the example of FIG. 6, the plurality of content may be broadcast content of first to fourth channels. The display device 100 may receive first to fourth channel signals. Each channel signal may include a video signal and an audio signal.

The audio signal received by the display device 100 may be a signal including a sound source. Accordingly, the display device 100 may obtain the sound source of content. The display device 100 may generate a sink sound source for transmission to a sink device 400 based on the sound source. The display device 100 may transmit the sink sound source to the sink device 400 to allow the sink device 400 to output the audio of content.

The sink device 400 may be a device that outputs audio based on a sink sound source received from the display device 100. Among the plurality of sink devices 400, a first sink device 401 may be a sound bar, a second sink device 402 may be headphones, a third sink device 403 may be first earphones, a fourth sink device 404 may be second earphones, and a fifth sink device 405 may be an audio broadcast. However, this is only an example, and the sink device 400 may be various audio output devices or facilities.

The display device 100 may include a multiview display engine 910, a sound engine 920, and a Bluetooth output engine 930.

The multiview display engine 910 may perform a multi-view function. The multiview display engine 910 may simultaneously output videos of a plurality of content based on video signals received from the outside. The multiview display engine 910 may perform a multi-view function of dividing the screen of the display 180 into a plurality of regions and displaying content in each of the regions.

The sound engine 920 and the Bluetooth output engine 930 may transmit audio signals to the sink device 400 based on received audio signals.

The sound engine 920 may include a decoder 921 and an effector 922.

The decoder 921 may convert a sound source to an audio source file. The audio source file may have a PCM (Pulse Code Modulation) file format. A PCM file may be a file created by converting an analog voice signal to a digital pulse signal.

The effector 922 may generate an audio sink file. The effector 922 may generate an audio sink file by performing post-processing on the audio source file. For example, the effector 922 may generate an audio sink file by sequentially arranging audio source files or adjusting the volume levels of the audio source files.

The Bluetooth output engine 930 may include an encoder 931. The encoder 931 may generate a sink sound source by encoding an audio sink file. The Bluetooth output engine 930 may transmit a sink sound source to the sink device 400.

Meanwhile, the multiview display engine 910, the sound engine 920, and the Bluetooth output engine 930 have been described assuming that they have different configurations as described above, but they may have the same configuration. For example, the multiview display engine 910, the sound engine 920, and the Bluetooth output engine 930 may all be the controller 170. Hereinafter, the description will be given assuming that the controller 170 performs the operations of the multiview display engine 910, the sound engine 920, and the Bluetooth output engine 930.

Next, the operation of the display device according to an embodiment of the present disclosure will be described in detail with reference to FIG. 7.

Figure 7:
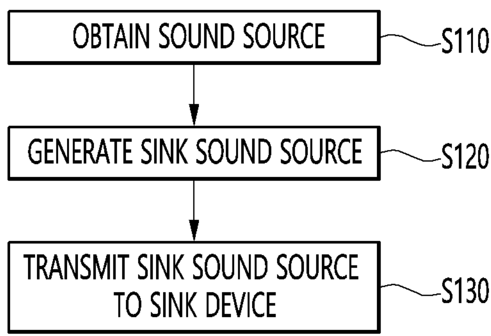
FIG. 7 is a flowchart illustrating a method by which a display device transmits a sink sound source according to an embodiment of the present disclosure.

FIG. 7 is a flowchart illustrating a method by which a display device transmits a sink sound source according to an embodiment of the present disclosure.

The controller 170 may obtain a sound source (S110).

The controller 170 may obtain a plurality of sound sources respectively corresponding to a plurality of content.

The controller 170 may generate a sink sound source (S120).

The controller 170 may generate a sink sound source based on the plurality of sound sources received. The controller 170 may generate a sink sound source to be transmitted for each sink device 400. The controller 170 may generate at least part of a first sink sound source to be transmitted to the first sink device 401, a second sink sound source to be transmitted to the second sink device 402, a third sink sound source to be transmitted to the third sink device 403, and the fourth sink sound sources to be transmitted to the fourth sink device 404.

A method by which the display device 100 according to an embodiment of the present disclosure generates a sink sound source will be described in detail with reference to FIG. 8.

Figure 8:
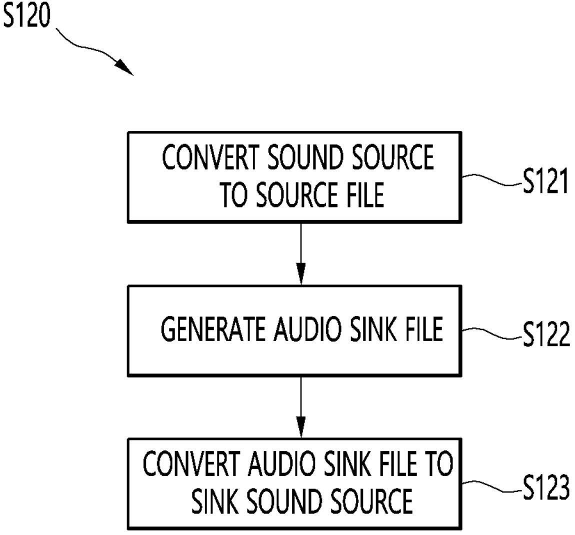
FIG. 8 is a flowchart illustrating a method by which a display device generates a sink sound source according to an embodiment of the present disclosure.

FIG. 8 is a flowchart illustrating a method by which a display device generates a sink sound source according to an embodiment of the present disclosure.

FIG. 8 is a flowchart for specifically describing step S120 of FIG. 7.

The controller 170 may convert a sound source to an audio source file (S121).

The controller 170 may convert each of a plurality of sound sources to an audio source file. The controller 170 may convert the first to fourth sound sources to first to fourth audio source files, respectively.

The controller 170 may generate an audio sink file (S122).

The controller 170 may generate an audio sink file by performing post-processing on the audio source files.

The audio source file may be a file for generating a sound source to be transmitted to the sink device 400. The controller 170 may generate an audio source file for each sound source. The controller 170 may generate at least part of a first audio source file for generating a first sound source, a second audio source file for generating a second sound source, a third audio source file for generating a third sound source, and a fourth audio source file for generating a fourth sound source.

According to an embodiment, the controller 170 may generate an audio sink file based on a user input. The controller 170 may generate an audio sink file based on a user input that selects at least one of the sink devices 400.

Next, a method for generating an audio sink file in a display device according to an embodiment of the present disclosure will be described in detail with reference to FIG. 9.

Figure 9:
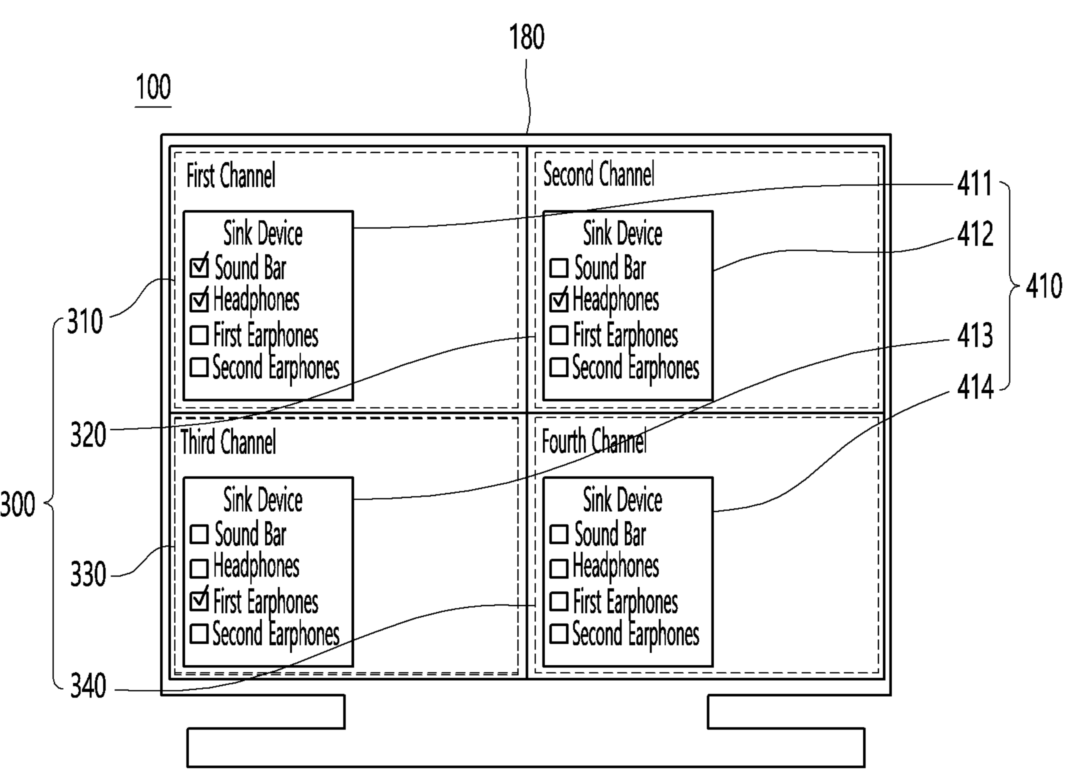
FIG. 9 is a diagram illustrating an example of a screen displayed by a display device to obtain a user input for selecting at least one of sink devices 400 according to an embodiment of the present disclosure.

FIG. 9 is a diagram illustrating an example of a screen displayed by a display device to obtain a user input for selecting at least one of sink devices 400 according to an embodiment of the present disclosure.

The controller 170 may display a first content item in the first region 310, a second content item in the second region 320, a third content item in the third region 330, and a fourth content item in the fourth region 340.

The controller 170 may display a sink device list 410 corresponding to each of a plurality of content items. For example, the controller 170 may display a first sink device list 411 corresponding to a first content item.

The sink device list 410 may include sink device items. The sink device item may be an item corresponding to the sink device 400. The sink device item may be the name of a sink device. The item corresponding to the first sink device 401 may be 'sound bar', the item corresponding to the second sink device 402 may be 'headphones', and the item corresponding to the third sink device 403 may be 'first earphones', the item corresponding to the fourth sink device 404 may be 'second earphones'.

The sink device list 410 may be a list for receiving selection for a sink device 400 to output audio of content. For example, the first sink device list 411 displayed in the first region 310 may be a list for receiving selection for a sink device 400 to output audio of first content.

The controller 170 may receive a user input for selecting 'sound bar' and 'headphones' among items included in the first sink device list 411. That is, the controller 170 may receive an input for selecting two or more sink devices 400 to output the sound of one content. Accordingly, the controller 170 may generate a first audio source file based on the sound source of the first content. Subsequently, the controller 170 may generate a first audio sink file and a second audio sink file based on the first audio source file. Additionally, the controller 170 may transmit a first sink sound source generated based on the first audio sink file to the first sink device 401 corresponding to the 'sound bar'. Furthermore, the controller 170 may transmit a second sink sound source generated based on the second audio sink file to the second sink device 402 corresponding to 'headphones'. Accordingly, audio of the first content may be output from the first sink device 401 and the second sink device 402. That is, audio of one content may be output from two or more v devices 400.

Meanwhile, the controller 170 may receive an input for commonly selecting 'headphones' among the items included in the first sink device list 411 and the second sink device list 412. That is, the controller 170 may receive an input for selecting one sink device 400 for two or more content. Accordingly, the controller 170 may generate a first audio source file based on the sound source of first content and generate a second audio source file based on the sound source of second content. Next, the controller 170 may generate a second audio sink file based on the first audio source file and the second audio source file. Furthermore, the controller 170 may transmit a second sink sound source generated based on the second audio sink file to the second sink device 402 corresponding to 'headphones'. Accordingly, audios of the first and second content may be output from the second sink device 402. That is, audios of two or more content may be output from one sink device 400.

Meanwhile, the controller 170 may identify that the 'second earphones' corresponding to the fourth sink device 404 is not selected in the all sink device lists 410. Accordingly, the controller 170 may not generate a fourth audio sink file corresponding to the fourth sink device 404.

Meanwhile, the controller 170 may identify that all items included in the fourth sink device list 414 are not selected. In this case, all of audio sink files generated by the controller 170 may not include data related to the fourth sound source. Accordingly, the audio of fourth content may not be output from all of the sink devices 400.

Again, description will be given with reference to FIG. 8.

The controller 170 may convert an audio sink file to a sink sound source (S123).

The controller 170 may convert the audio sink file to the sink sound source by encoding the audio sink file.

Again, description will be given with reference to FIG. 7.

The controller 170 may transmit the sink sound source to the sink device 400 (S130).

The controller 170 may transmit a sink sound source corresponding to each of the plurality of sink devices 400 to each of the plurality of sink devices 400.

For example, the controller 170 may transmit a first sink sound source to the first sink device 401, transmit a second sink sound source to the second sink device 402, and transmit a third sink sound source to the third sink device 403.

Meanwhile, the display device 100 may generate a sink sound source based on priority and allow audio of at least some of the plurality of content to be output.

The priority may be a priority set for a channel providing content.

For example, the priority of a first channel may be set to a first priority, and the priority of a second channel may be set to a second priority. The controller 170 may generate a sink sound source such that audio of the first channel with the highest priority is output while content of the first channel is displayed. The content of a channel may be a broadcast program. It should be noted that the content of the first channel may not be displayed while an advertisement is broadcast on the first channel. The controller 170 may generate a sink sound source such that audio of a second channel, which is next to the first channel, is output while content of the first channel is not displayed.

Additionally, when the display device 100 receives a user input for terminating display of a content item corresponding to the first channel, the display device 100 may generate a sink sound source such that audio of the second channel is output.

According to an embodiment, the priority may be a priority set for a scene of content. The controller 170 may generate a sink sound source such that the audio of a channel where the scene of content with the highest priority is displayed is output.

For example, a score change scene in a sports game may be set to have a first priority. The display device 100 may determine on which channel the score change scene is being displayed by analyzing the score display region of a baseball game in the video of content. The display device 100 may output the audio of a channel displaying the score change screen as a first priority.

For another example, a breaking news scene may be set to have a first priority. The display device 100 may determine on which channel the breaking news scene is being displayed by analyzing a region where breaking news subtitles are displayed in the video of content. The display device 100 may output the audio of the channel displaying breaking news subtitles as first priority. That is, the display device 100 may switch content for which audio is output based on priority.

Meanwhile, the display device 100 according to an embodiment of the present disclosure may adjust a volume level at which the sink sound source is to be output based on the type of the sink device 400. For example, when the sink device 400 includes earphones, the controller 170 may adjust the volume level of audio to be output from a sound bar to less than a preset level. Accordingly, an earphone user may be prevented from being disturbed by audio output from the sound bar. The preset level may be a level set to not disturb the earphone user by considering various factors such as the distance between the earphones and the sound bar and the number of sink devices 400.

Meanwhile, the display device 100 according to an embodiment of the present disclosure may receive content from a plurality of source devices 500. The source device 500 and the sink device 400 may be Bluetooth devices. The Bluetooth device may communicate with another Bluetooth device according to the Bluetooth standard the Bluetooth device itself supports.

The Bluetooth standard may be classified into Bluetooth Classic and Bluetooth Low Energy (LE). The Bluetooth LE is a version of Bluetooth developed after Bluetooth Classic, and is more power efficient than Bluetooth Classic. However, the Bluetooth Classic and the Bluetooth LE may not be compatible with each other.

Next, sound source transmission between a source device and a sink device complying with incompatible Bluetooth standards will be described with reference to FIGS. 10 and 11.

Figure 10:
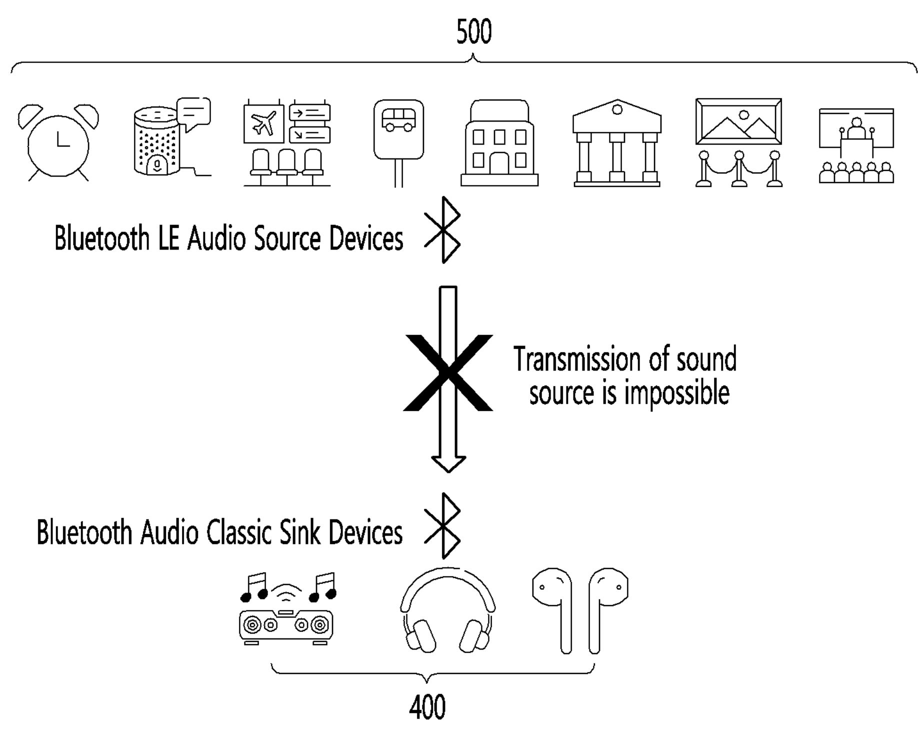
FIG. 10 is a diagram for describing sound source transmission between a source device and a sink device.

FIGS. 10 and 11 are diagrams for describing sound source transmission between a source device and a sink device.

Referring to FIG. 10, the sink device 400 may be a Bluetooth Audio Classic sink Device, and the source device 500 may be a Bluetooth LE audio source device. That is, the sink device 400 in FIG. 10 may be a device that supports Bluetooth Classic, and the source device 500 may be a device that supports Bluetooth LE.

Conversely, as shown in FIG. 11, the sink device 400 may be a Bluetooth LE audio source device, and the source device 500 may be a Bluetooth Audio Classic sink device. That is, the sink device 400 in FIG. 11 may be a device that supports Bluetooth LE, and the source device 500 may be a device that supports Bluetooth Classic.

As shown in FIGS. 10 and 11, when the Bluetooth versions of the sink device 400 and the source device 500 are not compatible with each other, the sink device 400 may be unable to receive a sound source transmitted by the source device 500.

The Bluetooth standard supported by a Bluetooth device may differ depending on the Bluetooth chip installed in the Bluetooth device. Therefore, there is a problem that it is difficult to solve communication restrictions according to Bluetooth standards.

However, as described above, the display device 100 according to an embodiment of the present disclosure may receive a sound source from the outside, generate a sink sound source, and transmit the sink sound source to a sink device.

In relation to this, details will be described with reference to FIG. 12.

Figure 12:
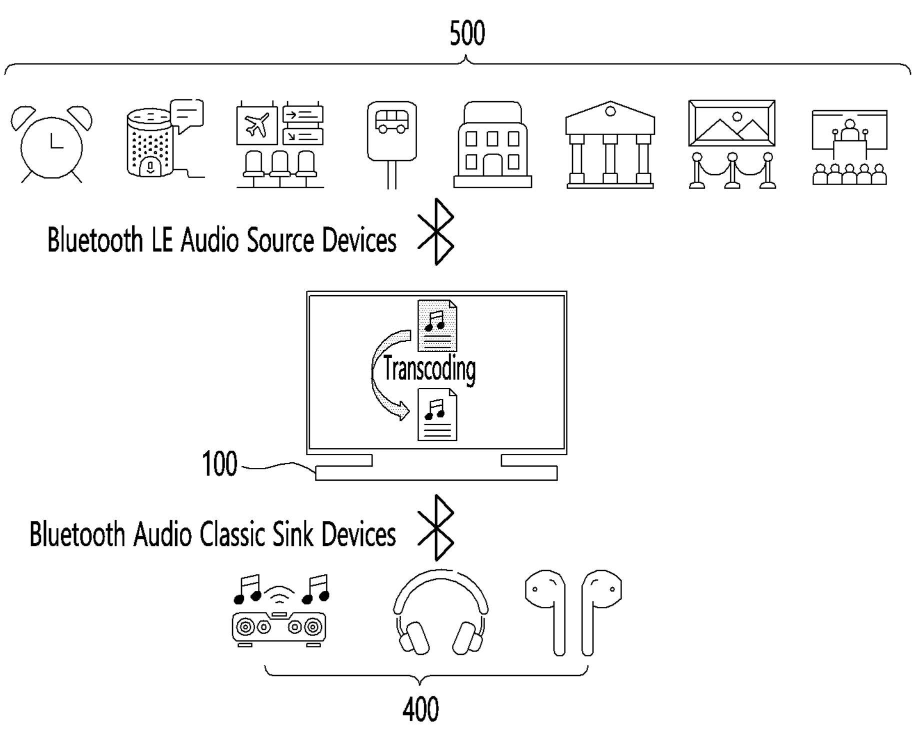
FIG. 12 is a diagram for describing an operation in which a display device transmits and receives a sound source between a source device and a sink device according to an embodiment of the present disclosure.

FIG. 12 is a diagram for describing an operation in which a display device transmits and receives a sound source between a source device and a sink device according to an embodiment of the present disclosure.

The display device 100 may receive a sound source from the source device 500 through Bluetooth communication. Next, the display device 100 may generate a sink sound source by transcoding the sound source. In the process of transcoding the sound source, the display device 100 may convert the codec of a sound source. For example, the display device 100 may receive a sound source whose audio codec is LC3 from a Bluetooth LE device. However, when the sink device 400 is a Bluetooth classic device, the sink device 400 may not support LC3. The display device 100 may generate a sink sound source whose audio codec has been converted to SBC or Aptx, which are audio codecs supported by the sink device 400. Accordingly, the sink device 400 may output audio of content provided by the source device 500.

FIG. 13 is a diagram for describing an operation in which a display device maps a source device and a sink device according to an embodiment of the present disclosure.

The controller 170 may determine, for each of the plurality of sink devices 400, which source device 500 to output content provided by. for each of the plurality of sink devices 400. That is, the controller 170 may map the source device 500 and the sink device 400.

Accordingly, even when the source device 500 or sink device 400 is a device that supports only 1:1 connection, there is an advantage in which audio is output as if the source device 500 and sink device 400 are connected in n:n correspondence.

FIG. 14 is a diagram for describing an operation in which a display device transmits a sink sound source to a sink device according to an embodiment of the present disclosure.

The controller 170 may generate a sink sound source to be transmitted to each sink device 400. For example, the controller 170 may generate a first sink sound source 710 to be transmitted to the first sink device 401. As shown in FIG. 14, 'artificial intelligence speaker', 'alarm clock', and 'airport announcement' may be selected among items included in a first source device list 511.

Accordingly, the controller 170 may generate a first sink sound source 710 based on sound sources received from the second source device 502 corresponding to the 'artificial intelligence speaker', the first source device 501 corresponding to the 'alarm clock', and the third source device 503 corresponding to the 'airport announcement'.

The controller 170 may generate the first sink sound source 710 based on the first audio source file 711, the second audio source file 712, and the third audio source file 713. Furthermore, the controller 170 may transmit the first sink sound source 710 to the first sink device 401.

Meanwhile, the controller 170 may adjust left and right output or apply various sound field effects in the process of generating the sink sound source.

Next, an operating method of the display device 100 according to an embodiment of the present disclosure will be described in detail with reference to FIG. 15.

Figure 15:
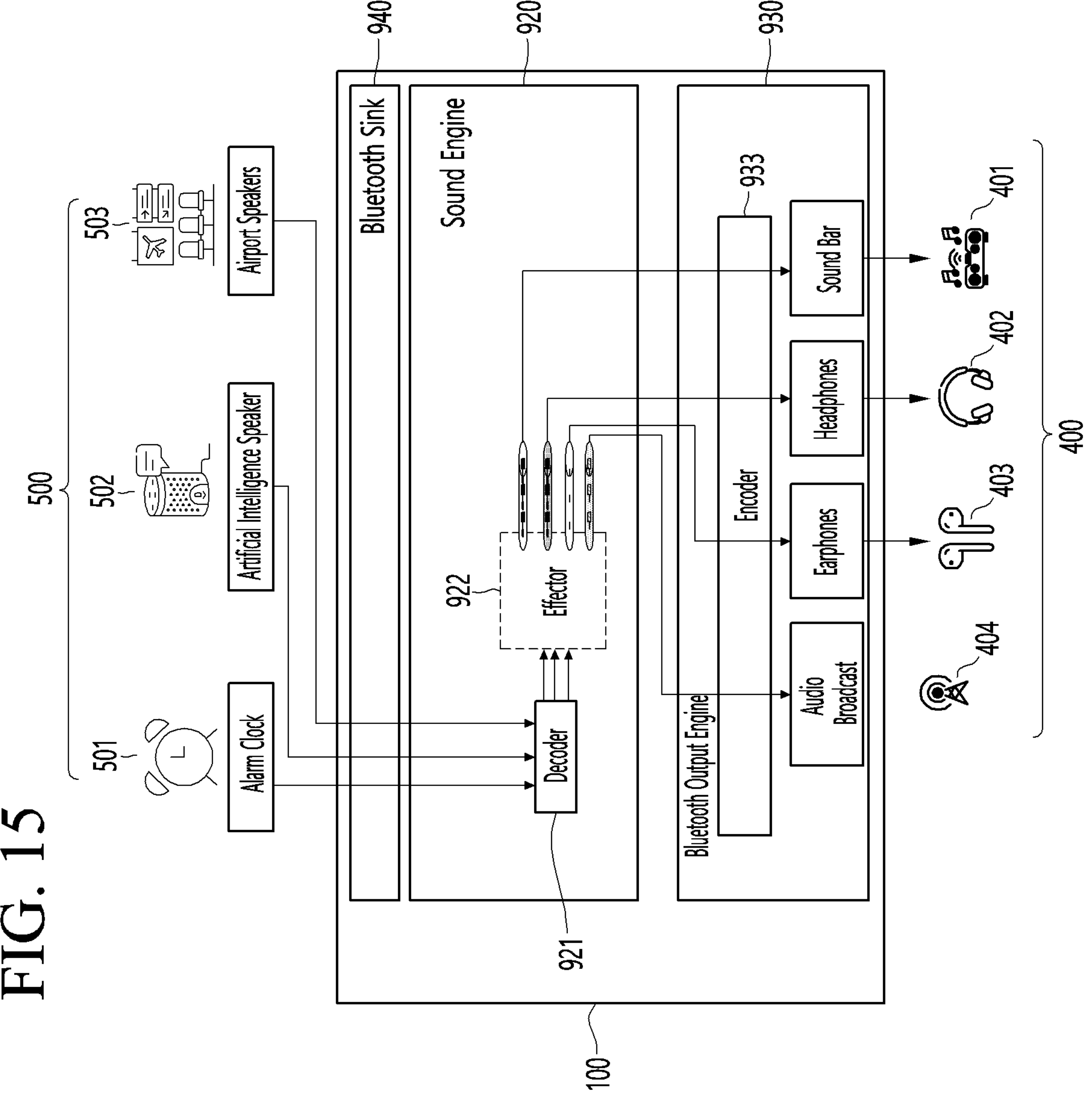
FIG. 15 is a diagram for describing a method by which a display device receives a sound source from a source device and transmits the sink sound source to a sink device according to an embodiment of the present disclosure.

FIG. 15 is a diagram for describing a method by which a display device receives a sound source from a source device and transmits the sink sound source to a sink device according to an embodiment of the present disclosure.

Descriptions overlapping with those of FIG. 6 with respect to the display device 100 of FIG. 15 will be omitted.

The display device 100 may include a Bluetooth sink 940, a Sound Engine 920, and a Bluetooth Output Engine 930.

The display device 100 may receive a sound source from each of a plurality of source devices 500. The display device 100 may receive a sound source from the source device 500 through the Bluetooth sink 940.

Among the plurality of source devices 500, a first source device 501 may be an alarm clock, a second source device 502 may be an artificial intelligence speaker, and a third source device 503 may be an airport speaker that outputs airport announcements. However, this is only an example, and the source device 500 may be various audio output devices or facilities.

Among the plurality of sink devices 400, the first sink device 401 may be a sound bar, the second sink device 402 may be headphones, the third sink device 403 may be earphones, and the fourth sink device 404 may be an audio broadcast. However, this is only an example, and the sink device 400 may be various audio output devices or facilities.

Meanwhile, the Bluetooth sink 940, the sound engine 920, and the Bluetooth output engine 930 have been described assuming that they have different configurations as described above, but they may have the same configuration. For example, the Bluetooth sink 940, the sound engine 920, and the Bluetooth output engine 930 may all be the controller 170. Hereinafter, the description will be given assuming that the controller 170 performs the operations of the Bluetooth sink 940, the sound engine 920, and the Bluetooth output engine 930.

Meanwhile, the display device 100 according to an embodiment of the present disclosure may generate a sink sound source based on priority.

FIG. 16 is a diagram for describing a sound output setting screen displayed by a display device according to an embodiment of the present disclosure.

The controller 170 may display a source device list 510 and a sink device list 410. When a sound output setting menu is entered, the controller 170 may display a source device list 510 and a sink device list 410. The sound output setting menu may be a menu for setting the sound output from each sink device 400. The controller 170 may generate a sink sound source based on a user input and transmit the sink sound source to the sink device 400. However, the screen in FIG. 14 is only an example of a screen displayed by the controller 170 to obtain a user input.

The sink device list 410 may be a list for receiving a selection for a sink device 400 to output audio of content. The sink device list 410 may include a sink device item corresponding to the sink device 400. For example, the sink device list 410 may include 'Soundbar' corresponding to the first sink device 401, 'Headphones' corresponding to the second sink device 402, 'Earphones' corresponding to the third sink device 403, and 'Broadcast name' corresponding to the fourth sink device 404.

The source device list 510 may be a list for receiving a selection for content to be transmitted to the sink device 400. The source device list 510 may include a source device item corresponding to the source device 500 that transmits the sound source to the display device 100. For example, the source device list 510 may include 'alarm clock' corresponding to the first source device 501, 'artificial intelligence speaker' corresponding to the second source device 502, and 'airport announcement' corresponding to the third source device 503.

Since the source devices 500 may provide different content, the source device item may have the same meaning as the content item. That is, the source device list 510 may have the same meaning as a content list.

The controller 170 may generate a sink sound source based on an input for selecting at least some of the items included in the sink device list 410 and the source device list 510. For example, when the controller 170 receives an input for selecting 'Artificial Intelligence Speaker', 'Alarm Clock', and 'Airport Announcement' included in the first source device list 511, the controller 170 may generate a first sink sound source to be transmitted to the sound bar that is the first sink device 501, based on selects 'Artificial Intelligence Speaker'. The first sink device based on sound sources received from the second source device 502 corresponding to the 'artificial intelligence speaker', the first source device 501 corresponding to the 'Alarm Clock', and the airport speaker corresponding to the third source device 503.

Meanwhile, when the controller 170 generates a sink sound source based on sound sources received from two or more source devices 500, the controller 170 may generate a sink sound source in different methods according to audio output methods. The audio output methods may include a sequential playback and a simultaneous playback.

When the controller 170 receives a user input for selecting the same sink device item from two or more sink device lists among the plurality of sink device lists 410, the controller 170 may obtain a user input for selecting an audio output method. The user input for selecting the audio output method may be an input for selecting 'sequential playback' or 'simultaneous playback'.

When the controller 170 obtains a user input for selecting sequential playback as the audio output method, the controller 170 may generate an audio sink file by sequentially arranging a plurality of audio source files. That is, when the controller 170 obtains a user input that selects sequential playback as the audio output method, the controller 170 may generate a sink sound source such that the audios of two or more content corresponding to the two or more sink device lists 410 are sequentially output.

When the controller 170 obtains a user input for selecting simultaneous playback as the audio output method, the controller 170 may generate an audio sink file by overlapping a plurality of audio source files. That is, when the controller 170 obtains a user input for selecting simultaneous playback as the audio output method, the controller 170 may generate a sink sound source such that the audios of two or more content corresponding to the two or more sink device lists 410 are simultaneously output.

Additionally, the controller 170 may post-process the audio source file based on priority. Specifically, the controller 170 may generate an audio sink file based on the audio output method and priority.

When outputting sound sources by the sequential playback, the controller 170 may place the audio source file of content with the highest priority at the earliest position. Accordingly, the controller 170 may generate a sink sound source such that the audio of the content with the highest priority is output in an earliest order.

Alternatively, when outputting sound sources by the simultaneous playback, the controller 170 may adjust the volume level of the audio source file of the content with the highest priority to a largest volume level. Accordingly, the controller 170 may generate a sink sound source such that the audio of the content with the highest priority is output at the largest volume level.

The priority may be set based on a user input or may be preset in the display device 100.

The controller 170 may set priorities based on a user input. For example, the controller 170 may set the priority based on a user input that moves a priority control icon 610.

The priority may be set in the display device 100 in advance. For example, the priority of the third sink device 503 among the first sink device 401, the second sink device 402, and the third sink device 503 may set to be the highest priority in the display device 100. Accordingly, the user may hear the announcement output from the airport speaker, which is the third sink device 503, at the largest volume level or in an earliest order.

The display device 100 according to an embodiment of the present disclosure may include a wireless communication interface 173 connected to a plurality of sink devices 400 that output audio of content, a display 180 that displays a content list including a plurality of content items and a plurality of sink device lists 410 respectively corresponding to the plurality of content items, and a controller 170 that obtains a plurality of sound sources respectively corresponding to the plurality of content and generates sink sound sources for transmission to at least part of the sink devices 400 based on the sound sources. The controller 170 may generate a sink sound source for transmission to the sink device 400 corresponding to the selected sink item based on a user input for selecting at least one of sink device items included in each of the plurality of sink device lists. In addition, when the display device 100 according to an embodiment of the present disclosure receives a user input for selecting two or more of the sink device items included in one of the one or more sink device lists 410, the display device 100 may generate two or more sink sound sources for transmission to the sink devices 400 corresponding to the selected sink device items selected based on the sound source corresponding to one sink device list 410.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

What is claimed is:

1. A display device comprising:

a wireless communication interface connected to a plurality of sink devices that output audio of content;

a display configured to display a content list including a plurality of content items respectively corresponding to a plurality of content and a plurality of sink device lists respectively corresponding to the plurality of content items; and a controller configured to:

obtain a plurality of sound sources respectively corresponding to the plurality of content, and generate a plurality of sink sound sources respectively corresponding to a first content item and a second content item based on different sound sources among the plurality of sound sources, wherein the controller is configured to concurrently transmit:

(i) a first sink sound source of the plurality of sink sound sources to a first sink device of the plurality of sink devices, and (ii) a second sink sound source of the plurality of sink sound sources to a second sink device of the plurality of sink devices, such that audio corresponding to the first sink sound source and audio corresponding to a second sink sound source are output concurrently via the first sink device and the second sink device, respectively, wherein the controller is further configured to obtain a user input for selecting an audio output method, when receiving a user input for selecting an identical sink device item from two or more sink device lists among the plurality of sink device lists, and wherein the audio output method includes a simultaneous playback and a sequential playback in the selected identical sink device item.

2. The display device of claim 1, wherein the controller is configured to generate two or more sink sound sources for transmission to sink devices respectively corresponding to selected sink device items based on a sound source of content corresponding to one sink device list of the plurality of sink device lists when receiving a user input for selecting two or more of sink device items included in one sink device of the one sink device list.

3. The display device of claim 2, wherein the controller is configured to adjust a volume to be output from each of the first and second sink sound sources based on a type of a sink device corresponding to the selected sink device item.

4. The display device of claim 1, wherein the controller is configured to generate a sink sound source based on a priority for a channel providing content or a scene of the content.

5. The display device of claim 4, wherein the controller is configured to:

generate the sink sound source such that audio of a first channel with a highest priority is output while content of the first channel is displayed when the priority is a priority set for the channel providing the content, and generate the sink sound source such that audio of a second channel whose priority is next to the priority of the first channel is output while the content of the first channel is not displayed.

6. The display device of claim 5, wherein the controller is configured to generate the sink sound source such that audio of the second channel is output when receiving a user input for ending display of a content item corresponding to the first channel.

7. The display device of claim 4, wherein the controller is configured to generate the sink sound source such that audio of a channel displaying a scene of content with a highest priority is output when the priority is set for the scene of the content.

8. The display device of claim 1, wherein the controller is configured to:

generate a third sink sound source such that audio of two or more content are simultaneously output when obtaining a user input for selecting the simultaneous playback as the audio output method, and generate a fourth sink sound source such that the audio of two or more content are sequentially output when obtaining a user input for selecting the sequential playback as the audio output method.

9. The display device of claim 1, wherein the controller is configured to generate the first and second sink sound sources based on the audio output method and priority.

10. The display device of claim 9, wherein the controller is configured to generate the first and second sink sound sources such that audio of content with a highest priority from the first and second sink sound sources is output at a largest volume level when obtaining a user input for selecting a simultaneous playback as the audio output method.

11. The display device of claim 9, wherein the controller is configured to generate the sink sound source such that audio of content with a highest priority is output in an earliest order when obtaining a user input for selecting the sequential playback as the audio output method.

* * * * *